United States Patent
Robert (10) Patent No.: US 11,656,129 B2
(45) Date of Patent: May 23, 2023

(54) SNAPSHOT INFRARED SENSOR

(71) Applicant: LYNRED, Palaiseau (FR)

(72) Inventor: Patrick Robert, Reaumont (FR)

(73) Assignee: LYNRED, Palaiseau (FR)

( * ) Notice: Subject to any disclaimer, the term of this patent is extended or adjusted under 35 U.S.C. 154(b) by 7 days.

(21) Appl. No.: 17/628,818

(22) PCT Filed: Jun. 26, 2020

(86) PCT No.: PCT/EP2020/068030
§ 371 (c)(1),
(2) Date: Jan. 20, 2022

(87) PCT Pub. No.: WO2021/043456
PCT Pub. Date: Mar. 11, 2021

(65) Prior Publication Data
US 2022/0260426 A1    Aug. 18, 2022

(30) Foreign Application Priority Data

Sep. 5, 2019 (FR) ........................... 1909764

(51) Int. Cl.
*G01J 5/24* (2006.01)
*G01J 5/20* (2006.01)

(52) U.S. Cl.
CPC ........... *G01J 5/24* (2013.01); *G01J 2005/202* (2013.01)

(58) Field of Classification Search
CPC .......... G01J 5/24; G01J 2005/202; G01J 5/48; G01J 5/0853; G01J 2005/0077
See application file for complete search history.

(56) References Cited

U.S. PATENT DOCUMENTS 5,442,176 A  *  8/1995  Eckel, Jr. ............ H01L 27/1465
                                                    257/E27.137
2010/0176298 A1 *  7/2010 Legras ................. H04N 25/671
                                                    702/135
(Continued)

FOREIGN PATENT DOCUMENTS

EP        2209305 A1     7/2010

OTHER PUBLICATIONS

International Search Report issued in PCT Patent Application No. PCT/EP2020/068030 dated Oct. 30, 2020.
(Continued)

*Primary Examiner* — Marcus H Taningco
(74) *Attorney, Agent, or Firm* — Marshall, Gerstein & Borun LLP (57) ABSTRACT

An infrared sensor includes an assembly of pixels juxtaposed in rows and in columns, each pixel integrating an imaging microbolometer and an integrator assembly. The integrator assembly includes a transistor assembled as an amplifier, and a capacitor assembled in feedback on the transistor between an output node and an integration node. The integration node is connected to a skimming transistor operating as a current mirror with a skimming control transistor offset outside of the pixel. A skimming current flowing through the skimming control transistor is controlled according to the temperature of at least one thermalized microbolometer. The current mirror assembly enables to transmit the skimming current flowing through said skimming control transistor onto the integration node so that the capacitor integrates the difference between a current flowing through the imaging microbolometer and the skimming current.

11 Claims, 5 Drawing Sheets

(56) References Cited

U.S. PATENT DOCUMENTS

2012/0119090 A1* 5/2012 Ha .................... G01J 5/24
250/340
2015/0055002 A1 2/2015 Beck
2015/0192628 A1* 7/2015 Becker ................ G01J 5/22
250/338.4

OTHER PUBLICATIONS

Mottin et al., Abstract for "Uncooled amorphous silicon technology enhancement for 25?m pixel pitch achievement," Infrared Technology and Application XXVIII, SPIE, vol. 4820E.

* cited by examiner

Fig. 1 (State of the art)

Fig. 2
(State of the art)

SNAPSHOT INFRARED SENSOR

TECHNICAL FIELD

The invention concerns a sensor of infrared radiations in the field of so-called "uncooled" infrared imaging. This sensor integrates an assembly of bolometric detectors forming the pixels of an infrared image. The invention more precisely concerns a snapshot infrared sensor enabling to instantaneously capture the pixels by means of a readout circuit integrated in each pixel.

The invention particularly advantageously applies to increase the frequency resolution of an infrared sensor or to suppress drag effects.

BACKGROUND

In the field of so-called "uncooled" infrared detectors, it is known to use monodimensional or bidimensional arrays of elements sensitive to infrared radiation, capable of operating at ambient temperature, that is to say not requiring cooling to very low temperatures, unlike detection devices called "quantum detectors", which require operation at very low temperature, typically that of liquid nitrogen.

An uncooled infrared detector conventionally uses the variation of a physical quantity of a suitable material called "thermometric" or "bolometric", according to its temperature. Most commonly, this physical quantity is the electric resistivity of said material, which varies greatly with temperature. The sensitive unit elements of the detector, or "microbolometers", are usually in the form of membranes, each comprising a layer of a thermometric material, and suspended above a substrate, generally made of silicon, via support arms having a high thermal resistance, the array of suspended membranes being usually called "retina".

Such membranes especially implement a function of absorption of the incident radiation, a function of conversion of the power of the absorbed radiation into thermal power, and a thermometric function of conversion of the generated thermal power into a variation of the resistivity of the thermometric material, such functions being implementable by one or a plurality of distinct elements. Further, the support arms of the membranes are also electrically conductive and connected to the thermometric layer thereof.

Means for sequential addressing and biasing of the thermometric elements of the membranes and means for forming electric signals usable in video format are usually formed in the substrate above which the membranes are suspended. The substrate and the integrated means are commonly called "readout circuit".

To compensate for the temperature drift of the detector, a solution generally implemented consists in placing in the electronic circuit for forming the signal in relation with the temperature of the imaging microbolometers, thus called since they are sensitive to the incident electromagnetic radiation, a focal plane temperature (FPT) compensation element, itself bolometric, that is, having its electric behavior following the substrate temperature, but remaining essentially insensitive to radiation.

This result is for example obtained by means of bolometric structures provided by construction with a low thermal resistance towards the substrate, and/or by masking these structures behind a shield opaque to thermal radiation. The implementation of such compensation elements further has the advantage of eliminating most of the so-called common mode current originating from imaging or "active" microbolometers.

Figure 1:
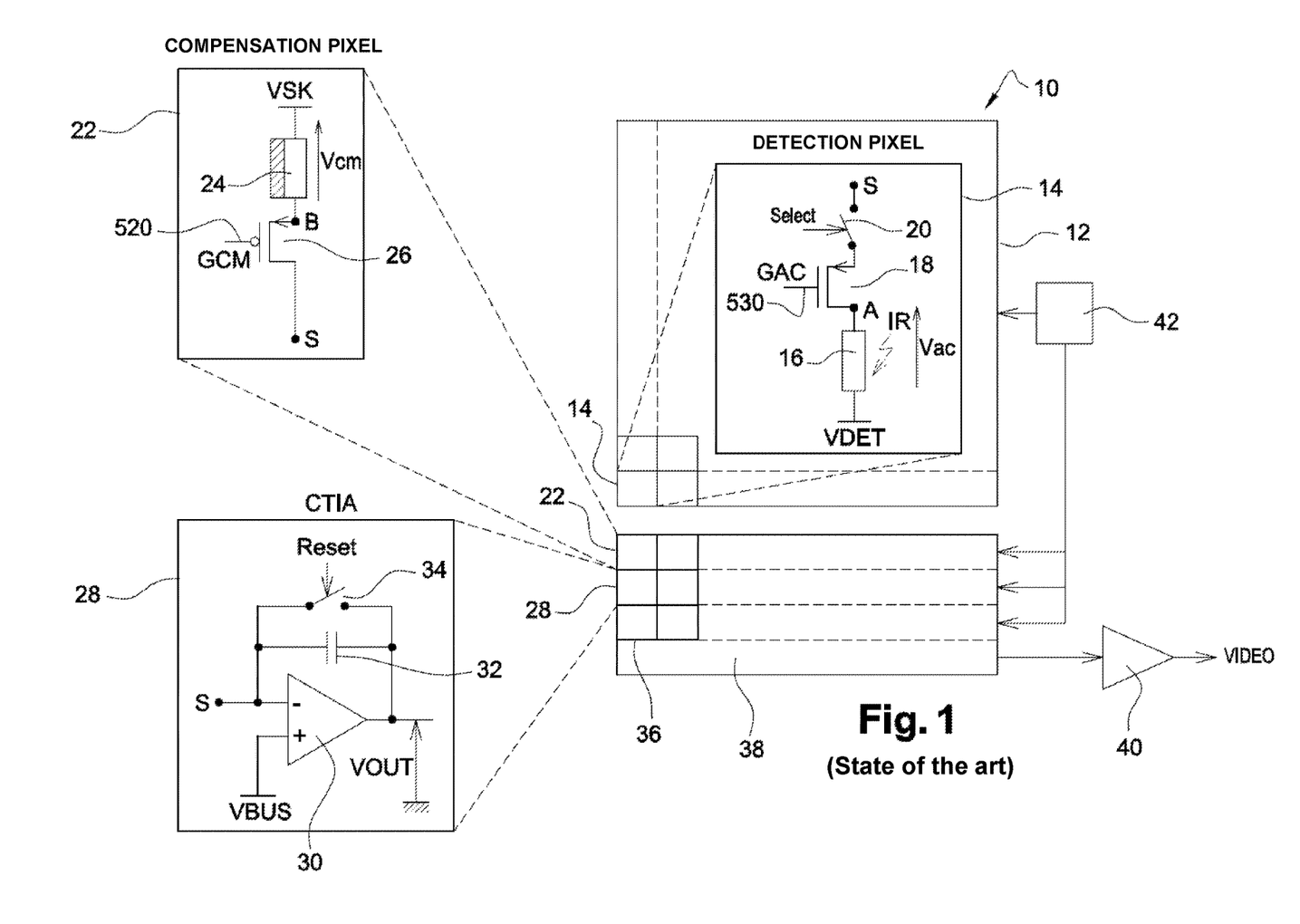
FIG. 1 illustrates an infrared sensor of the state of the art with a readout and skimming circuit arranged at the column foot.
Figure 2:
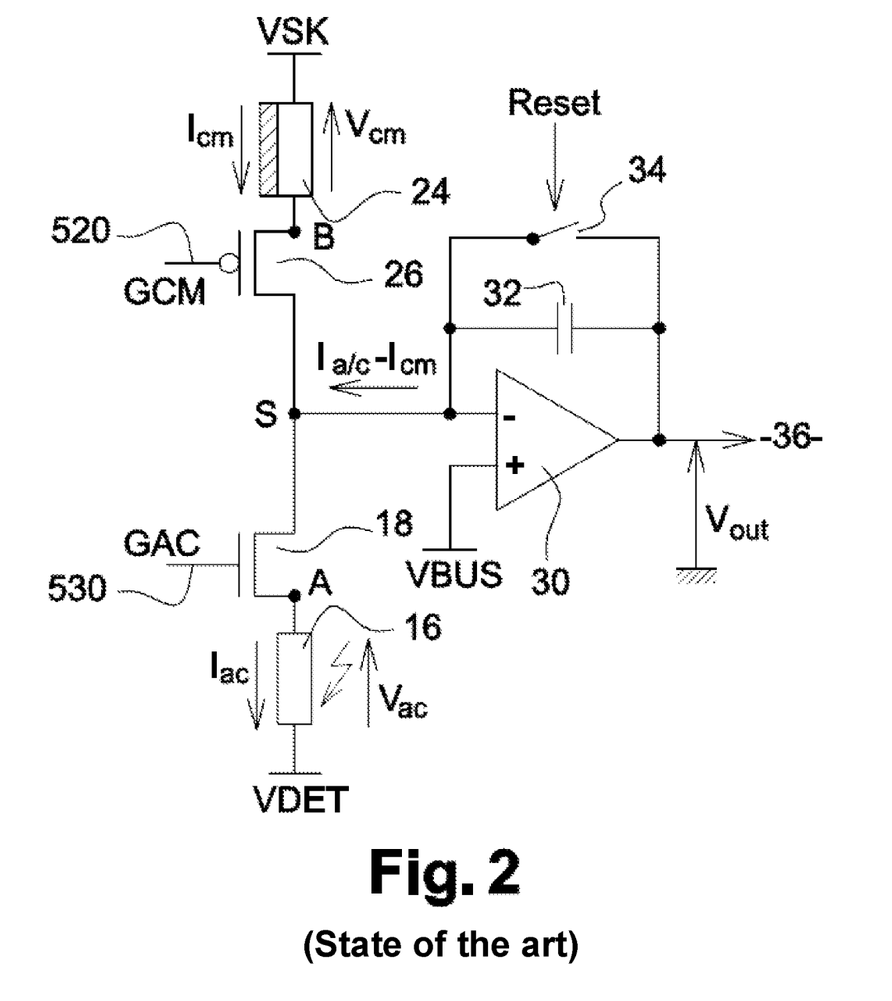
FIG. 2 illustrates the equivalent electric diagram of the reading from an imaging microbolometer of FIG. 1.

FIG. 1 is an electric diagram of a bolometric detector 10 without temperature regulation, or "TECless" detector, of the state of the art, comprising a common-mode compensated structure. FIG. 2 is an electric diagram of a circuit implemented to form a read signal of a microbolometer of the common-mode compensated detector. Such a detector is for example described in document: "Uncooled amorphous silicon technology enhancement for 25 µm pixel pitch achievement"; E. Mottin et al, Infrared Technology and Application XXVIII, SPIE, vol. 4820E.

Detector 10 comprises a bidimensional array 12 of identical unit bolometric detection elements 14, or "pixels", each comprising a sensitive resistive microbolometer 16 in the form of a membrane suspended above a substrate, such as previously described, having electric resistance $R_{ac}$.

Each microbolometer 16 is connected by one of its terminals to a constant voltage VDET, particularly the ground of detector 10, and by its other terminal to a MOS biasing transistor 18 operating in saturated state, for example, an NMOS transistor, setting voltage $V_{ac}$ across microbolometer 16 by means of a gate control voltage GAC.

If A designates the node corresponding to the source of MOS 18 and if VA is the voltage at this node, which depends on gate voltage GAC, voltage $V_{ac}$ is then equal to $V_{ac}$=VA−VDET.

Pixel 14 also comprises a selection switch 20, connected between MOS transistor 18 and a node S provided for each column of array 12, and driven by a control signal Select, enabling to select bolometer 16 for the reading thereof. Transistor 18 and switch 20 are usually formed in the substrate under the influence of the membrane of microbolometer 16. Elements 16 and 18 form a so-called detection branch.

Particularly, since the pixels are identical and voltage VDET, on the one hand, and voltage GAC, on the other hand, are identical for all pixels, bolometers 16 are thus voltage-biased under the same voltage $V_{ac}$. Further, gate voltage GAC being constant, voltage $V_{ac}$ is thus also constant.

Detector 10 also comprises, at the foot of each column of array 12, a compensation structure 22, also usually called "skimming" structure. As previously described, the value of the electric resistance of detection microbolometers 16 is mainly dictated by the substrate temperature. The current flowing through a detection microbolometer 16 thus comprises a significant component which depends on the substrate temperature and is independent from the observed scene. Compensation structure 22 has the function of delivering an electric current for purposes of partial or total compensation of this component.

Compensation structure 22 comprises a compensation microbolometer 24, of electric resistance $R_{cm}$, made insensitive to the incident radiation originating from the scene to be observed. Microbolometer 24 is formed by means of the same thermometric material as microbolometer 16, but has a very low thermal resistance towards the substrate. For example:
- the resistive elements of compensation microbolometer 24 are directly formed in contact with the substrate, or
- compensation microbolometer 24 comprises a membrane similar to that of the detection microbolometers 16 suspended above the substrate by means of structures having a very low thermal resistance, or also
- compensation microbolometer 24 comprises a membrane and support arms substantially identical to those of detection microbolometers 16 and a material which is a good thermal conductor fills the space between the membrane of microbolometer 24 and the substrate.

The electric resistance of microbolometer 24 is thus essentially dictated by the substrate temperature, microbolometer 24 then being said to be "thermalized" to the substrate.

Typically, this thermalized microbolometer 24 is mutualized for a plurality of microbolometers 24 and it is placed at the head or at the foot of each column of array 12.

Microbolometer 24 is connected by one of its terminals to a positive constant voltage VSK, and compensation structure 22 further comprises a MOS biasing transistor 26 operating in saturated state, having a polarity opposite to that of the transistors 18 of detection pixels 14, for example, a PMOS transistor, setting voltage $V_{cm}$ across microbolometer 24 by means of a gate control voltage GCM, and connected between the other terminal of compensation microbolometer 24 and node S.

Calling B the node corresponding to the drain of MOS transistor 26 and VB the voltage at this node, voltage $V_{cm}$ is then equal to $V_{cm}$=VSK−VB. Elements 24 and 26 form a so-called compensation branch common to each column. The value of the compensation common-mode current is defined by the value of the resistance $R_{cm}$ of microbolometer 24 and of the biasing parameters thereof.

Detector 10 also comprises, at the foot of each column of array 12, an integrator 28 of CTIA type, for "Capacitive TransImpedance Amplifier", for example comprising an operational amplifier 30 and a single capacitor 32 of fixed capacitance $C_{int}$ connected between the inverting input and the output of amplifier 30. The inverting input and the non-inverting input of the latter are further respectively connected to node S and to a positive constant voltage VBUS. Voltage VBUS thus forms a reference for the output signals, and is between VDET and VSK.

A switch 34 driven by a signal Reset is also formed in parallel with capacitor 32, for the discharge thereof. The outputs of CTIAs 28 are for example connected to respective sample-and-hold circuits 36 for the delivery of the voltages $V_{out}$ of the CTIAs in multiplexed mode by means of a multiplexer 38 towards one or a plurality of series output amplifier(s) 40. It may also be integrated at the output of the digitizing means by analog-to-digital converters, also known under acronym "ADC".

Detector 10 finally comprises a sequencing unit 42 controlling the different previously-described switches. In operation, array 12 is read from row by row. To read from a row of array 12, the switches 20 of pixel row 14 are turned on and the switches 20 of the other rows are turned off. The successive reading from all the rows of array 12 forms a frame.

For the reading from a microbolometer 16 of a row of array 12 selected for the reading, after a phase of discharge of the capacitors of the CTIAs at the foot of the column, achieved by the turning on of switches 34 by means of signal Reset, followed by their turning off, a circuit such as shown in FIG. 2 is thus obtained for each pixel in the row which is being read from.

A current $I_{ac}$ flows through the detection microbolometer 16 of the pixel under the effect of its voltage biasing by MOS transistor 18, and a current $I_{cm}$ flows through the compensation microbolometer 24 of the compensation structure under the effect of its voltage biasing by MOS transistor 26. These currents are subtracted from each other at node S, and the resulting current difference is integrated by CTIA 28 during a predetermined integration period $T_{int}$. The output voltage $V_{out}$ of CTIA 28 thus is a measurement of the variation of the resistance of detection microbolometer 16 caused by the incident radiation to be detected since the non-useful part of current $I_{ac}$ depending on the substrate temperature is at least partly compensated for by the current $I_{cm}$ specifically generated to copy this non-useful part.

Assuming that the electric resistances of active microbolometer 16 and of compensation microbolometer 24 are not significantly modified on biasing thereof by a self-heating phenomenon, and that CTIA 28 does not saturate, the output voltage $V_{out}$ of the integrator at the end of integration time $T_{int}$ can be expressed by relation:

$$V_{out} = V_{bus} + \frac{1}{C_{int}} \int_0^{\Delta T_{int}} (i_{ac} - i_{cm}) dt = \frac{(i_{ac} - i_{cm}) \cdot T_{int}}{C_{int}} + VBUS$$

As known per se, a CTIA has a fixed electric output dynamic range or "readout" dynamic range. Below a first quantity of electric charges received as an input, the CTIA supplies a fixed low voltage, called "low saturation voltage" $V_{satL}$. Similarly, above a second quantity of electric charges received as an input, the CTIA supplies a fixed high voltage, called "high saturation voltage" $V_{satH}$.

The above-mentioned relation expresses the linear behavior of the CTIA, when it receives a quantity of electric charges greater than the first quantity of electric charges, and smaller than the second quantity of electric charges. The readout dynamic range is essentially determined by the value of capacitance $C_{int}$ of capacitor 32. Particularly, when this capacitance is fixed, that is, constant over time, the readout dynamic range of the CTIA is also fixed.

By convention, in the context of the invention, low and high saturation voltages $V_{satL}$ and $V_{satH}$ are the limits between which the CTIA delivers an output considered as linear, even if it is generally capable of delivering voltages lower or higher than these limits.

Further, the capacitance of the integration capacitor also determines the sensitivity, or more exactly the responsivity, of the detector. The responsivity of a detector is defined by the variation of output signal $V_{out}$ in relation with the variation of the input signal (scene temperature $T_{scene}$), that is, $dV_{out}/dT_{scene}$.

This responsivity depends on the microbolometer manufacturing technology, on the characteristics of the readout circuit, on the integration time, and on the surface area of the microbolometer. Based on the ratio of the noise, present on the output signal of the detector, to this responsivity, it is possible to define the detector performance, also known under acronym "NETD" for "Noise Equivalent Temperature Difference", expressed in mK. More precisely, it is desired to minimize the NETD, by limiting the noise present on the output signal of the detector and by maximizing the responsivity. To maximize the responsivity, it is conventional to use the largest possible surface area of each pixel to form the microbolometer by arranging, under the microbolometer, the components forming the circuit for addressing the readout circuit.

Thus, it is currently possible to obtain a NETD smaller than 50 mK with a 64-µs integration time for a row or a column.

The integration time being directly linked to the responsivity and to the NETD, it is not possible to decrease this integration time without degrading the NETD, even if new manufacturing technologies enable to obtain microbolometers with decreased time constants. As a result, current bolometers do not enable to rapidly capture an infrared image since the readout circuit has to scan the rows or the columns to form an image, with an integration time that cannot be decreased.

In the visible or cooled infrared domains, there exist snapshot sensors where each pixel integrates a measurement circuit to obtain a simultaneous capture of the state of all the pixels of a sensor.

However, in the field of uncooled infrared, the integrator assembly with a column foot CTIA associated with the bolometric bridge requires electronic circuits that cannot be integrated in the surface of a pixel. Indeed, the integrator assembly of the readout circuit requires the use of a thermalized microbolometer to perform a skimming of the integration current and to compensate for the temperature variations of the substrate.

Now, by arranging a microbolometer thermalized to the substrate next to an imaging microbolometer in each pixel, the surface area of the imaging microbolometer would be necessarily decreased since the imaging microbolometer and the thermalized microbolometer have to be formed in suspension above the substrate. Thus, by decreasing the surface area of the imaging microbolometer, the NETD would also be decreased.

The technical problem of the invention comprises improving the speed of acquisition of an infrared image while keeping the current performance of infrared sensors, that is a NETD smaller than or equal to 50 mK.

SUMMARY OF THE DISCLOSURE

To solve this technical problem, the invention provides integrating a readout circuit in each pixel with an integrator assembly comprising few components. To integrate this readout circuit, the invention also provides an assembly enabling to offset the thermalized microbolometer outside of each pixel. Thus, a thermalized microbolometer or an assembly of thermalized microbolometers may be used to perform the current skimming of a plurality of, or even of all, the pixels of the infrared sensor.

For this purpose, the invention concerns an infrared sensor comprising an assembly of pixels juxtaposed in rows and in columns, each pixel integrating an imaging microbolometer connected between a reference voltage and an integration node via an injection transistor having a gate voltage enabling to set a voltage across the imaging microbolometer so that the resistance variations of the imaging microbolometer, due to infrared radiations, cause a variation of a current flowing through said imaging microbolometer.

The invention is characterized in that said infrared sensor comprises, under the surface of each pixel, an integrator assembly comprising:

a transistor assembled as an amplifier between said integration node and an output node;

and a capacitor assembled in feedback on said transistor between said output node and said integration node;

said integration node being connected to a skimming transistor operating as a current mirror with a skimming control transistor offset outside of said pixel, a skimming current crossing said skimming control transistor being controlled according to the temperature of at least one thermalized microbolometer, said current mirror assembly enabling to transmit said skimming current flowing through said skimming control transistor onto said integration node so that said capacitor integrates the difference between said current flowing through said imaging microbolometer and said skimming current.

The invention thus enables to integrate a readout circuit in each pixel to perform a simultaneous reading from the pixels of the infrared sensor. With this snapshot capture, the invention enables to obtain an infrared detector operating with an integration time equivalent to the frame time. The latter may advantageously be improved and enables to acquire up to 500 images per second with a NETD smaller than or equal to 50 mK.

In the state of the art, to obtain a NETD smaller than or equal to 50 mK, the row time is approximately 64 images per second while the biasing current of the imaging microbolometer is in the order of a few microamperes.

This bias current is a function of the voltage imposed across the imaging microbolometer and of the resistivity obtained by construction of the imaging microbolometer.

According to an embodiment of the invention, the imaging microbolometer has a resistance in the range from 40 to 60 M$\Omega$ for a 30° C. temperature. In the state of the art, an imaging microbolometer conventionally comprises a resistance substantially equal to 1 M$\Omega$ at ambient temperature. The use of this much higher resistance enables to modify the operating point and, in particular, the imaging microbolometer bias current.

In the state of the art, the current of a few microamperes causes a self-heating of the imaging microbolometer. The use of a readout circuit integrated in each pixel enables to use a variable integration time from a few tens of seconds to several milliseconds and the detector biasing point may be drastically decreased to keep a NETD smaller than or equal to 50 mK.

For this purpose, it is possible to use a bias current fifty times smaller than in the state of the art, which does not take the imaging microbolometer into its thermal runaway area.

The modification of the operating point enables to obtain a "continuous" operating mode, that is, without using precharge phases. The operation of the infrared sensor may thus be entirely modified since the state of the art of uncooled detectors implements a "pulsed" operation with readout phases and precharge phases to limit the thermal runaway of imaging microbolometers.

According to an embodiment, the skimming current is in the range from 50 to 200 nanoamperes.

The fact of decreasing the biasing to a few tens of nanoamperes implies that the CMOS technology used in this embodiment should not introduce leakage currents of the CMOS transistors, likely to disturb the integrated circuit at the level of each pixel. Certain CMOS technologies have leakage currents of transistors of a few nanoamperes, although the latter are electrically off, the selection of the technology thus is a very important point. Preferably, the CMOS technology should enable to obtain transistors with a leakage current smaller than 1 nA.

Further, the use of a very low bias current enables to limit the power consumption of the readout circuit and, thus, to limit the general power consumption of the infrared detector. Indeed, conversely to conventional devices where readout circuits are arranged for each column of the infrared detector, the use of one readout circuit per pixel risks increasing the power consumption of the infrared detector. By using a bias current much lower than those used in the state of the art, this embodiment enables to control the power consumption of the infrared detector.

This biasing and the amplification performed by the readout circuit are two distinctive elements between the invention and existing readout circuits integrated in each pixel in the visible range. Indeed, in the visible range, it is not necessary to apply a voltage biasing or an amplification to read the value of each pixel, so that it is much simpler to integrate the readout circuit in each pixel.

The skimming current is obtained by a current mirror assembly with an offset portion comprising at least one thermalized microbolometer. This offset portion is preferably common for all pixels. A single thermalized microbolometer may be used to form the skimming current.

As a variant, a plurality of thermalized microbolometers may be assembled in parallel at the level of the offset portion to improve the accuracy of the skimming current.

For example, five thermalized microbolometers can easily be integrated, conversely to the state of the art which uses a single thermalized microbolometer, since it has to be duplicated on all the columns to perform a simultaneous integration of a same row.

According to an embodiment, the gate voltage of the injection transistor is controlled according to a bias control transistor, offset outside of said pixel, according to the temperature of at least one thermalized microbolometer.

Thus, in the same way as for the skimming current, the gate voltage of the injection transistor may be obtained by five thermalized microbolometers assembled in parallel. This embodiment enables to suppress, more efficiently than in the state of the art, variations linked to the substrate temperature.

Preferably, the biasing of the amplifier-assembled transistor is performed by the application of a reference voltage at the level of a terminal of said amplifier-assembled transistor, opposite to that coupled to said output node.

The reference voltage is preferably applied by a diode-assembled transistor. This embodiment enables to limit the bulk of the readout circuit. The voltage across the forward-assembled diode is in the order of 0.7 V, according to the CMOS technology used. This voltage enables to set the value of the low saturation level of the CTIA, which corresponds to the receiving of a very low level of infrared flux. This assembly advantageously replaces a solution with a reference voltage that should be distributed to the entire array.

In addition to the biasing of the integration node, said output node is preferably biased by the application of a current in the range from 0.5 to 2 microamperes.

Further, the output node is preferably coupled to a switched-capacitor filter formed of a switch and of a capacitor. This embodiment enables to decrease the bandwidth of the noise since the latter depends on the value of the capacitance of the capacitor and on the integration frequency.

At the output of the switched-capacitor filter, the assembly preferably comprises a readout capacitor intended to be charged, after the integration, to allow the reading of the resulting voltage of the readout circuit while performing another integration. Preferably, the switches necessary to form the switched-capacitor filter and the charge transfer into the readout capacitor are formed with transistors operating in switched mode.

Further, the output of the readout circuit may be formed of a transistor assembled as a voltage follower. This embodiment enables to ease the output signal impedance matching.

Preferably, the pitch of each pixel of the infrared sensor is smaller than or equal to 25 micrometers.

BRIEF DESCRIPTION OF THE DRAWINGS

The present invention will be better understood on reading of the following description provided as an example only in relation with the accompanying drawings, where the same reference numerals designate the same or similar elements, in which.

DETAILED DESCRIPTION

Figure 3:
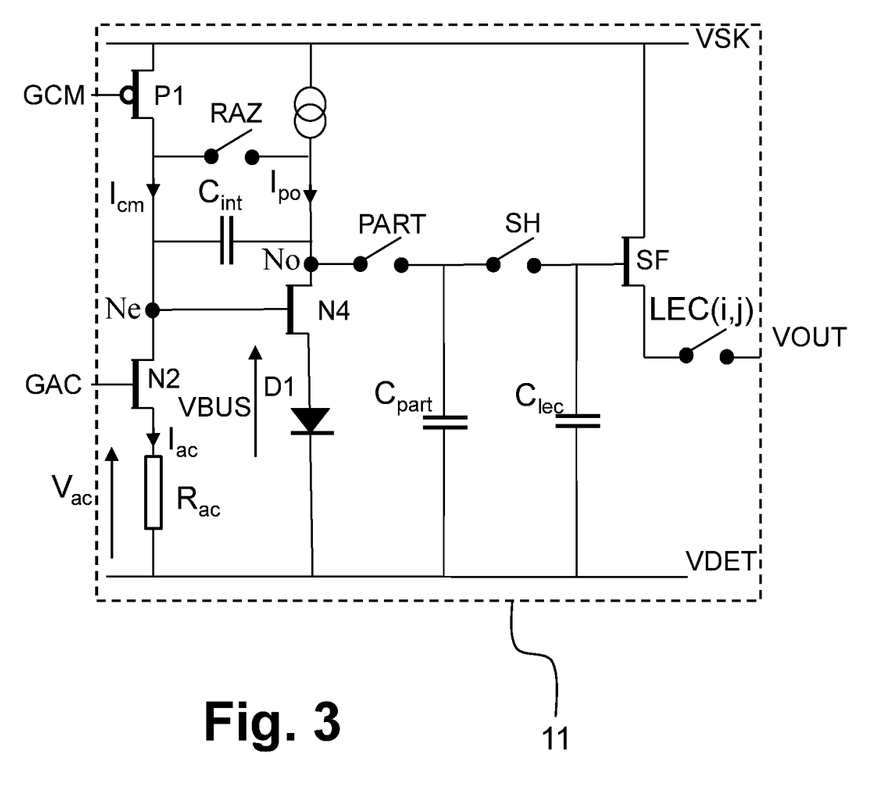
FIG. 3 illustrates a readout circuit integrated under a pixel of an infrared sensor according to an embodiment of the invention.

FIG. 3 illustrates a readout circuit 11 of an imaging microbolometer integrated under the surface of each pixel of an infrared sensor. The structure of the imaging microbolometer is similar to that described in the state of the art, that is, it integrates a membrane sensitive to the infrared radiation having a resistivity varying according to the infrared radiation captured by this membrane. This membrane is coupled by at least two pads to the readout circuit 11 illustrated in FIG. 3.

Within this readout circuit 11, the assembled formed by the pads and the membrane is schematized by bolometric resistor $R_{ac}$, which corresponds to the variable resistance of the imaging microbolometer of each pixel. Unlike membranes of the state of the art, the membrane of the imaging microbolometer is formed in such a way that the resistance of the imaging microbolometer is in the range from 40 to 60 MΩ at ambient temperature. Typically, for a 30° C. temperature, the membrane may be formed to have a 50 MΩ resistance. This specific resistance may be conventionally reached by adapting the thickness of the material forming the membrane and/or the design of the membrane, for example, the length of the support and heat dissipation arms.

Under the imaging microbolometer, the substrate integrates a CMOS stage comprising all the other components illustrated in the readout circuit 11 of FIG. 3. This readout circuit 11 is preferably formed with transistors exhibiting a leakage current smaller than 1 nA.

As illustrated in FIG. 3, readout circuit 11 comprises an injection transistor N2 enabling to set the voltage $V_{ac}$ across the imaging microbolometer by means of its gate voltage GAC. Thus, the voltage $V_{ac}$ across the imaging microbolometer is fixed and imposed via gate voltage GAC by the assembly of FIG. 5. Further, the imaging microbolometer is also connected to a voltage source VDET, preferably the ground of readout circuit 11. In the example of FIG. 3, the imaging microbolometer is connected to the bottom of readout circuit 11 by means of an NMOS-type injection transistor N2. As a variant, the left-hand portion of the circuit may be turned upside down and the imaging microbolometer may be connected via a PMOS transistor to the top of the readout circuit without changing the invention.

In addition to the source coupled to the imaging microbolometer, the drain of the injection transistor N2 is connected to an integration node Ne. This integration node Ne is also connected to a PMOS-type skimming transistor P1. Skimming transistor P1 is coupled to a constant voltage source VSK. The gate voltage GCM of this skimming transistor P1 is connected to an offset circuit 19 (FIG. 4) enabling to transmit a skimming control signal to all the readout circuits 11 of the different pixels. As a variant, a plurality of offset circuits 19 may be used for different readout circuits integrated under different pixels without changing the invention. Further, the left-hand portion of the circuit may be turned upside down and skimming transistor P1 may be formed by an NMOS transistor without changing the invention.

Integration node Ne is also coupled to the gate of a transistor N4 assembled as an amplifier to form a CTIA-type assembly with a capacitor $C_{int}$ assembled in feedback between an output node No and integration node Ne. Thus, the drain of transistor N4 is connected to output node No, while the gate of this transistor N4 is connected to integration node Ne. Output node No is also connected to a switch RAZ enabling to short-circuit capacitor $C_{int}$ to reset the integration.

To obtain a constant voltage equivalent to the lower saturation threshold of a CTIA-type integrator, the source of transistor N4 is connected to constant voltage VDET via a diode D1. Preferably, this diode D1 is formed by a diode-assembled transistor.

Further, the output node is also coupled to a current source connected between constant voltage VSK and output node No to apply a fixed current, for example 1 µA, on the drain of transistor N4 and to bias the latter.

For example, injection transistor N2 is biased with a current $I_{cm}$ in the order of 100 nA.

The current $I_{Ac}$ flowing through bolometric resistor $R_{ac}$ corresponds to the bias current $I_{cm}$ plus the current variations due to the resistance variations of bolometric resistor $R_{ac}$. At the level of integration node Ne, bias current $I_{cm}$ is subtracted to current $I_{Ac}$, and only the current variations due to the resistance variations of bolometric resistor $R_{ac}$ are integrated in capacitor $C_{int}$.

At the level of output node No, readout circuit 11 also comprises a switched-capacitor filter comprising a switch PART and a capacitor $C_{part}$ connected between switch PART and constant voltage VDET. When switch PART is turned on, the charges present in integration capacitor $C_{int}$ are transferred into storage capacitor $C_{part}$. Then, switch PART may be turned off and a new integration may be performed after the turning on of switch RAZ for a few microseconds.

Similarly, the charges present in capacitor $C_{part}$ may then be transferred to a readout capacitor $C_{lec}$, connected between a switch SH and constant voltage VDET, when switch SH is turned on. The reading from this capacitor $C_{lec}$ is obtained by an NMOS-type output transistor SF having its drain connected to voltage VSK and the source is coupled to an output signal VOUT via a switch LEC(i,j).

When the infrared sensor requires the reading of the pixel corresponding to the readout circuit of FIG. 3, the i and j coordinates of the pixel in the array are used to control switch LEC(i,j) and obtain the voltage value across capacitor $C_{lec}$.

Figure 4:
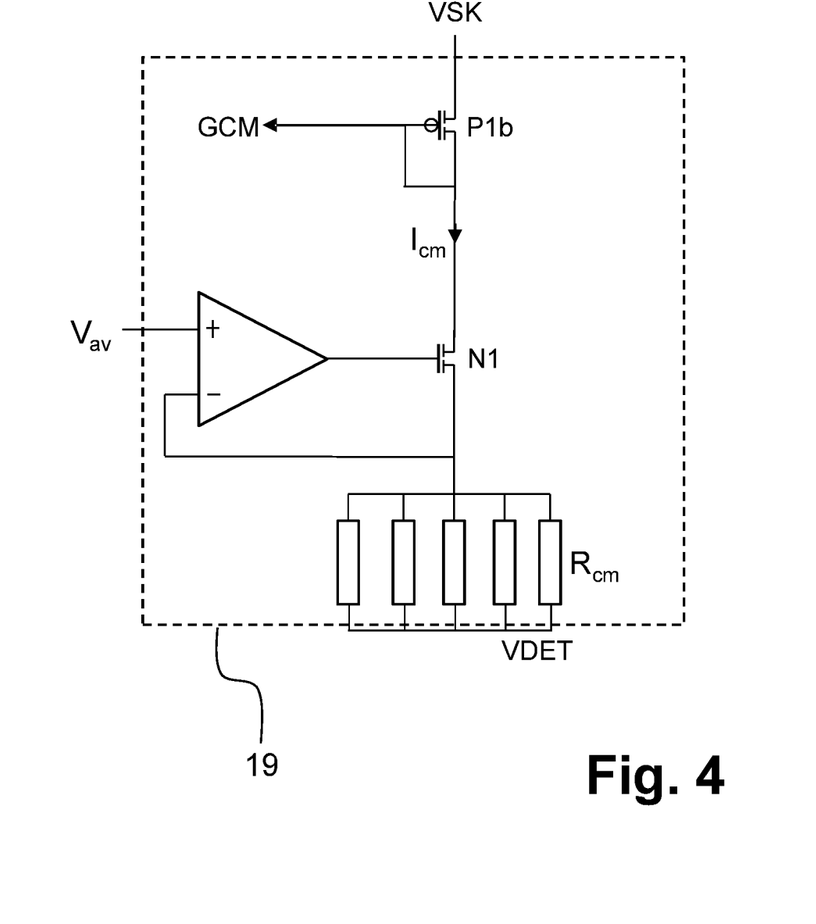
FIG. 4 illustrates an offset skimming control circuit intended to be connected to the readout circuit of FIG. 3 according to an embodiment of the invention.
Figure 5:
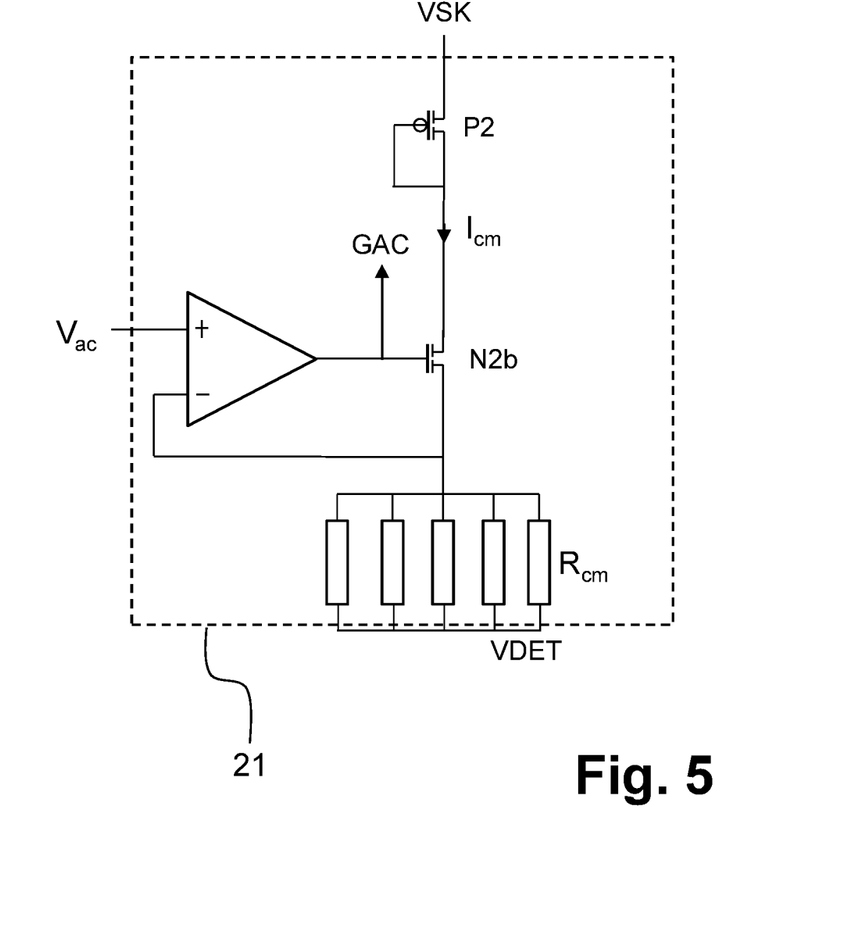
FIG. 5 illustrates an offset bias control circuit intended to be connected to the readout circuit of FIG. 3 according to an embodiment of the invention.

In addition to these elements present at the level of each pixel, the circuits illustrated in FIGS. 4 and 5 are preferably mutualized for all the pixels to deliver the gate voltages of GAC and GCM of transistors N2 and P1.

FIG. 4 illustrates the generation of gate voltage GCM by means of a circuit 19 integrating five thermalized microbolometers, of equivalent resistance $R_{cm}$, assembled in parallel. Preferably, these thermalized microbolometers are formed in the same way as the imaging microbolometers of the pixels and have the same resistivity. However, these thermalized microbolometers are insulated from the observed scene by means of a protection shield so that they only capture the temperature variations of the substrate corresponding to the temperature variations of the focal plane of the image.

In the state of the art, a thermalized microbolometer is used at the level of each readout circuit of each column: there are thus as many thermalized microbolometers as columns in the array. In the invention, these five thermalized microbolometers are sufficient to deliver all the gate voltages GCM, which significantly decreases the surface area used around the pixels to form these thermalized microbolometers while improving the accuracy of skimming current $I_{cm}$ by averaging the current flowing through a plurality of thermalized microbolometers.

In circuit 19, a voltage $V_{av}$ originating from a digital-to-analog converter, not shown, enables to adjust gate voltages GCM and, more particularly, the current $I_{cm}$ intended to flow between the transistor P1 and the integration node Ne of each readout circuit 11. For this purpose, the five thermalized microbolometers are connected between constant voltage VDET and the source of an NMOS-type transistor N1.

The gate of this transistor N1 is connected to the output of an operational amplifier having its positive input coupled to voltage $V_{av}$ and its negative input connected to the source of this transistor N1. The drain of transistor N1 is connected to the drain of a PMOS-type transistor P1b. The source of this transistor P1b is connected to constant voltage VSK and the gate voltage of this transistor P1b enables to deliver voltage GCM.

Further, this transistor P1b is assembled in feedback with the gate coupled to the drain to form, with transistor P1, a current mirror where the current $I_{cm}$ obtained by the thermalized microbolometers is copied between transistor P1 and integrating node Ne. If the left-hand assembly of the readout circuit 11 of FIG. 3 is turned upside down, this circuit 19 also has to be turned upside down.

The assembly of FIG. 5 is close to that of FIG. 4 with the difference that gate voltage GAC is not extracted at the level of the gate of PMOS transistor P2, but at the level of the gate of NMOS transistor N2b. The voltage $V_{ac}$ imposed at the input of the operational amplifier enables to set the voltage across the imaging microbolometer by a current mirror operation between transistors N2 and N2b.

Similarly, current $I_{cm2}$ is copied by a current mirror assembly between the transistors N2 of FIG. 3 and N2b of the circuit 21 of FIG. 5. However, the current $I_{ac}$ flowing through bolometric resistor $R_{ac}$ is not directly equivalent to $I_{cm2}$ since it depends on the heating of the imaging microbolometer caused by the infrared flux.

Thus, with these very few components, the invention enables to obtain a very accurate reading of all the pixels of an infrared sensor.

Further, the elements of the readout circuit 11 of FIG. 3 may be integrated under the surface of each pixel to obtain a simultaneous reading of all the pixels of an infrared image. Thereby, the infrared image acquisition speed is significantly optimized, particularly for high resolutions (and for example 1280×1024 pixels).

The invention claimed is:

1. An infrared sensor comprising an assembly of pixels juxtaposed in rows and in columns, each pixel integrating an imaging microbolometer connected between a reference voltage and an integration node via an injection transistor having a gate voltage enabling to set a voltage across the imaging microbolometer, so that the resistance variations of the imaging microbolometer, due to infrared radiations, cause a variation of a current flowing through said imaging microbolometer, wherein the infrared sensor comprises, under the surface of each pixel, an integrator assembly comprising:

a transistor assembled as an amplifier between said integration node and an output node; and a capacitor assembled in feedback on said transistor between said output node and said integration node;

said integration node being connected to a skimming transistor operating as a current mirror with a skimming control transistor offset outside of said pixel, a skimming current flowing through said skimming control transistor being controlled according to the temperature of at least one thermalized microbolometer, said current mirror assembly enabling to transmit the skimming current flowing through the skimming control transistor onto the integration node so that said capacitor integrates the difference between said current flowing through said imaging microbolometer and said skimming current.

2. An infrared sensor according to claim 1, wherein the gate voltage of the injection transistor is controlled according to a bias control transistor, offset outside of pixel, according to the temperature of at least one thermalized microbolometer.

3. An infrared sensor according to claim 1, wherein the skimming current is in the range from 50 to 200 nanoamperes.

4. An infrared sensor according to claim 1, wherein said infrared sensor comprises transistors having a leakage current smaller than 1 nA.

5. An infrared sensor according to claim 1, wherein the imaging microbolometer has a resistance in the range from 40 to 60 MΩ for a 30° C. temperature.

6. An infrared Infrarcd sensor according to claim 1, wherein a biasing of the amplifier-assembled transistor is performed by the application of a reference voltage at the level of a terminal of said amplifier-assembled transistor, opposite to the terminal coupled to said output node.

7. An infrared sensor according to claim 6, wherein the reference voltage is applied by a diode-assembled transistor.

8. An infrared sensor according to claim 1, wherein the output node is biased by the application of a bias current in the range from 0.5 to 2 microamperes.

9. An infrared sensor according to claim 1, wherein the output node is coupled to a switched-capacitor filter formed of a switch and of a capacitor.

10. An infrared sensor according to claim 9, wherein the switched-capacitor filter is coupled to a readout capacitor intended to be charged, after the integration, to allow a reading of a voltage while performing another integration.

11. An infrared sensor according to claim 1, wherein the output node is coupled to a transistor assembled as a voltage follower.

* * * * *